United States Patent [19]
Pearson

[11] Patent Number: 5,688,432
[45] Date of Patent: Nov. 18, 1997

[54] REPLACEMENT REFRIGERANT COMPOSITION

[75] Inventor: Stephen Forbes Pearson, Glasgow, United Kingdom

[73] Assignee: Star Refrigeration Limited, United Kingdom

[21] Appl. No.: 619,720

[22] PCT Filed: Sep. 20, 1994

[86] PCT No.: PCT/GB94/02042

§ 371 Date: Apr. 19, 1996

§ 102(e) Date: Apr. 19, 1996

[87] PCT Pub. No.: WO95/08602

PCT Pub. Date: Mar. 30, 1995

[51] Int. Cl.[6] .................................................. C09K 5/04
[52] U.S. Cl. .................................................. 252/67
[58] Field of Search ............................ 252/67; 62/114

[56] References Cited

U.S. PATENT DOCUMENTS 5,108,637  4/1992  Pearson ...................... 252/67

FOREIGN PATENT DOCUMENTS

| 539952 | 5/1993 | European Pat. Off. . |
| 4-018485 | 1/1992 | Japan . |
| 5-117643 | 5/1993 | Japan . |
| 93/15163 | 8/1993 | WIPO . |
| 94/00529 | 1/1994 | WIPO . |

*Primary Examiner*—Anthony Green
*Attorney, Agent, or Firm*—Gifford, Krass, Groh, Sprinkle, Patmore, Anderson & Citkowski, P.C.

[57] ABSTRACT

A refrigerant composition for use in a vapour-compression refrigeration apparatus as a replacement for currently used refrigerants R22 and R12 comprises a mixture of pentafluoroethane (R125), tetrafluoroethane (R134a), a hydrocarbon selected from isobutane (R600a) and propane (R290), and optionally octafluoroethane (R218). The composition contains no chlorine atoms and is non-depleting to atmospheric ozone; but specific compositions have pressure-temperature relations substantially the same as R22 and R12 thereby allowing their use as direct replacements therefor in existing refrigeration apparatus.

7 Claims, 2 Drawing Sheets

REPLACEMENT REFRIGERANT COMPOSITION

TECHNICAL FIELD

The present invention relates to a refrigerant composition, which contains no chlorine atoms.

BACKGROUND

Chlorofluorocarbon (CFC) gases, such as refrigerant R12 ($CCl_2F_2$), have been used for many years as refrigerants and are especially used in domestic refrigerators and car air conditioning systems. However, such gases have been implicated in environmental damage. These gases, which are very inert, are released from refrigeration systems at ground level and diffuse into the upper atmosphere. Because of their inertness, the gases are able to survive without decomposition until they reach the stratosphere where they are broken down by ultra-violet radiation, releasing chlorine atoms which catalyse breakdown of the stratospheric ozone layer. There has recently been considerable concern about reduction in stratospheric ozone levels and this has led to proposed restrictions and prohibitions on certain CFC's.

Other refrigerants such as chlorodifluoromethane (R22) are environmentally less objectionable as they tend to be degraded naturally at lower levels of the atmosphere before reaching the ozone layer. However, R22 contains chlorine and is still considered to contribute to ozone depletion. Further, R22 has a higher index of compression than, for example, R12, such that compressor discharge temperatures become excessive at pressure ratios which would not cause excessive discharge temperatures if R12 were being used.

It is among the objects of the present invention to provide a refrigerant composition which does not contain any chlorine but which has acceptable refrigerant characteristics for use in vapour compression refrigerators as a replacement for refrigerant R22 and/or R12 in existing refrigeration equipment.

SUMMARY OF THE INVENTION

According to a first aspect of the present invention there is provided a refrigerant composition for use in a refrigeration apparatus which comprises a mixture of:

(i) pentafluoroethane;

(ii) tetrafluoroethane; and (iii) a hydrocarbon selected from isobutane, propane and mixtures thereof.

The composition may optionally also contain (iv) octafluoropropane.

A further aspect of the present invention provides a method of refrigeration which employs the composition as a refrigerant medium, particularly a vapour-compression refrigerator.

A still further aspect provides a refrigeration apparatus which employs the composition as a refrigerant medium, particularly a vapour-compression refrigerator.

None of the components of the mixture contribute to ozone depletion nor are any toxic to humans. Further, the mixture may be used with a variety of existing lubricants as conventionally used in vapour compression refrigeration apparatus, including mineral oil lubricants, alkylbenzene lubricants and polyolester lubricants. Specialised lubricants are not required.

It is found that by forming mixtures of these three or four components in chosen proportions, it is possible to provide refrigerant compositions which have pressure-temperature relationships which are sufficiently similar to those of the current refrigerants R22 and R12 to allow their use as replacements therefor in existing refrigeration equipment. The pressure-temperature relationship refers to the vapour pressure of the refrigerant composition at various temperatures corresponding to those used in the refrigeration apparatus. Thus, the design pressure capabilities of the apparatus are not exceeded. It is also found that the refrigeration capacities of the compositions of the invention may be arranged to be similar to those of the current refrigerants R22 and R12, so that the refrigeration capacity (i.e. the amount of cooling produced) of refrigeration apparatus intended to be used with R22 or R12 respectively is substantially unaffected.

Advantageously, the compositions of the invention tend to have lower compressor discharge temperatures than the corresponding conventional refrigerant.

The pentafluoroethane (R125) is preferably present in an amount of 0.5 to 60 wt %, particularly 1 to 50 wt %. In compositions for use as an R22 replacement, R125 is preferably present in percentages at the upper end of this range e.g. 20 to 45 wt %, particularly 27 to 40 wt %. In compositions for use as an R12 replacement, the amount of R125 is usually at the low end of this range e.g. 0.5 to 10 wt %, especially 1 to 10 wt. %.

The tetrafluoroethane (preferably R134a) is generally present in an amount of 30 to 98 wt %, particularly 30 to 90 wt. %, and usually forms the major proportion of the composition. When used as an R22 replacement, the composition of the invention usually employs 45 to 70% of R134a; whereas for use in replacing R12 the percentage of R134a usually lies in the range 80 to 90 wt. %.

For safety reasons, the hydrocarbon should preferably be present in a non-flammable proportion so that in the event of a leak of refrigerant medium into the atmosphere, no explosive or flammable mixture is produced. A hydrocarbon content of 1 to 11 wt %, particularly 2 to 10 wt. %, and preferably 3 to 5 wt. % is preferred. In particular, a non-flammable composition is one which contains the components of the mixture in such a ratio that when the composition is mixed with air in practical proportions (e.g. in the event of a leak) no flammable mixture results. The fluorocarbon components R125 and R218 possess fire-retardant properties to a degree. Thus, the assessment of flammability characteristics is not necessarily predictable but can be determined by routine experimentation (see, for example, our patent U.S. Pat. No. 5,108,637).

The octafluoropropane (R218) is an optional constituent and is typically present in an amount of 0 to 20 wt. %. It has a long lifetime when released into the atmosphere so that future legislation may make its use less preferred. It is generally present in an amount of 4 to 15 wt %, particularly 5 to 10 wt. %.

DESCRIPTION OF PREFERRED EMBODIMENTS

In a preferred embodiment as an R22 replacement, the composition comprises a mixture of:

(i) 20 to 45 wt % pentafluoroethane (R125);

(ii) 45 to 70 wt % tetrafluoroethane (e.g. R134a);

(iii) 2 to 8 wt % isobutane (R600a); and (iv) 5 to 10 wt % octafluoropropane (R218).

The pressure-temperature relationship of this mixture is similar to that of chlorodifluorethane (R22). The refrigerating performance is also similar within acceptable limits.

However, the mixture has a lower index of compression than R22, resulting in lower compressor discharge temperatures, and of course contains no chlorine.

A preferred embodiment for use as an R12 replacement comprises a mixture of:

(i) 0.5 to 5 wt % pentafluoroethane (R125);
(ii) 75 to 98 wt % tetrafluoroethane (R134a);
(iii) 1 to 6 wt % isobutane (R600a); and
(iv) 6 to 15 wt % octafluoropropane (R218).

The composition according to the invention (RX3) comprised 40 wt. % R125, 6 wt. % R218, 50 wt. % R134a and 4 wt. % R600a and is intended as a replacement for currently used R22 refrigerant.

Figure 1:
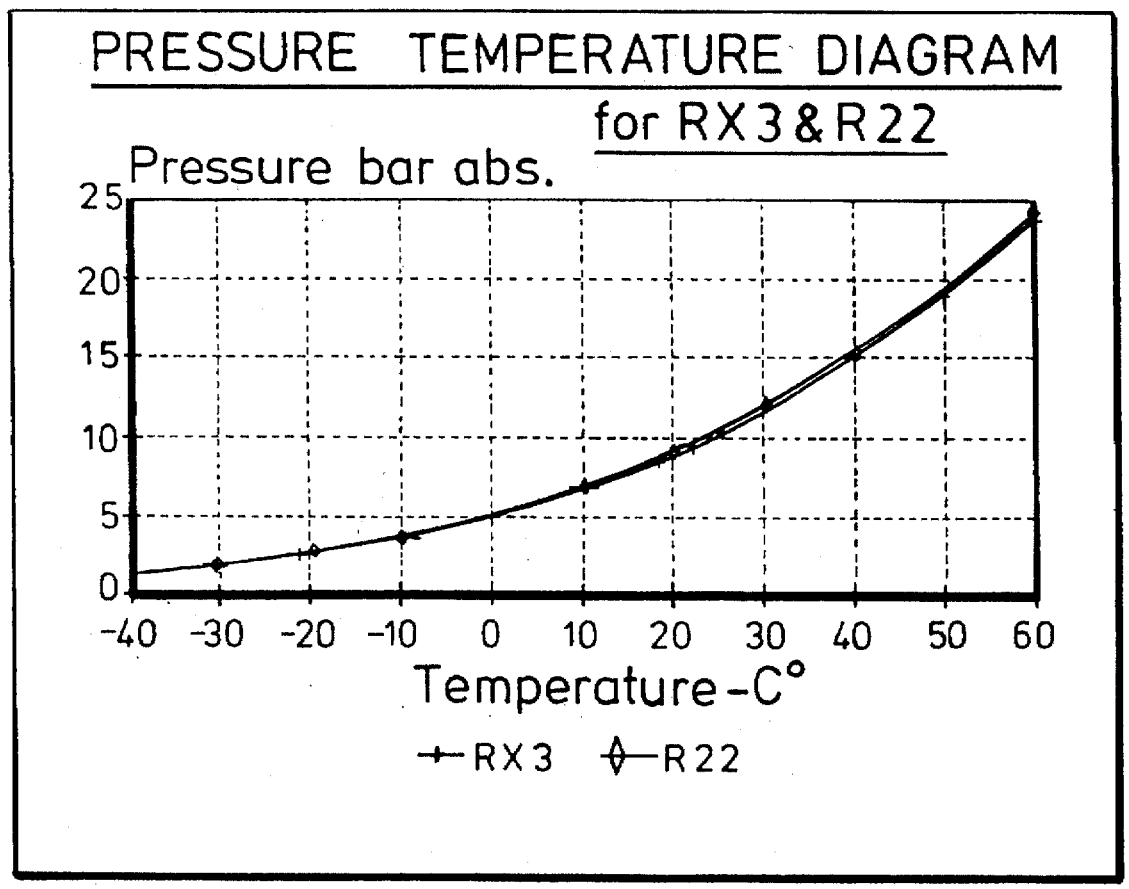
FIG. 1 shows the pressure-temperature diagrams for a composition according to the invention (RX3) and conventional R22 refrigerant.

The composition in liquid form was introduced into an evacuated vessel and allowed to equilibrate. The vessel was heated to various temperatures and the vapour pressure in the presence of liquid noted. It can be seen from FIG. 1 that the pressure-temperature relationship is very similar to that for R22, which means that the pressures encountered using the composition of the invention will not in substance exceed those of R22. Thus the design pressures of the apparatus will not be exceeded.

Figure 2:
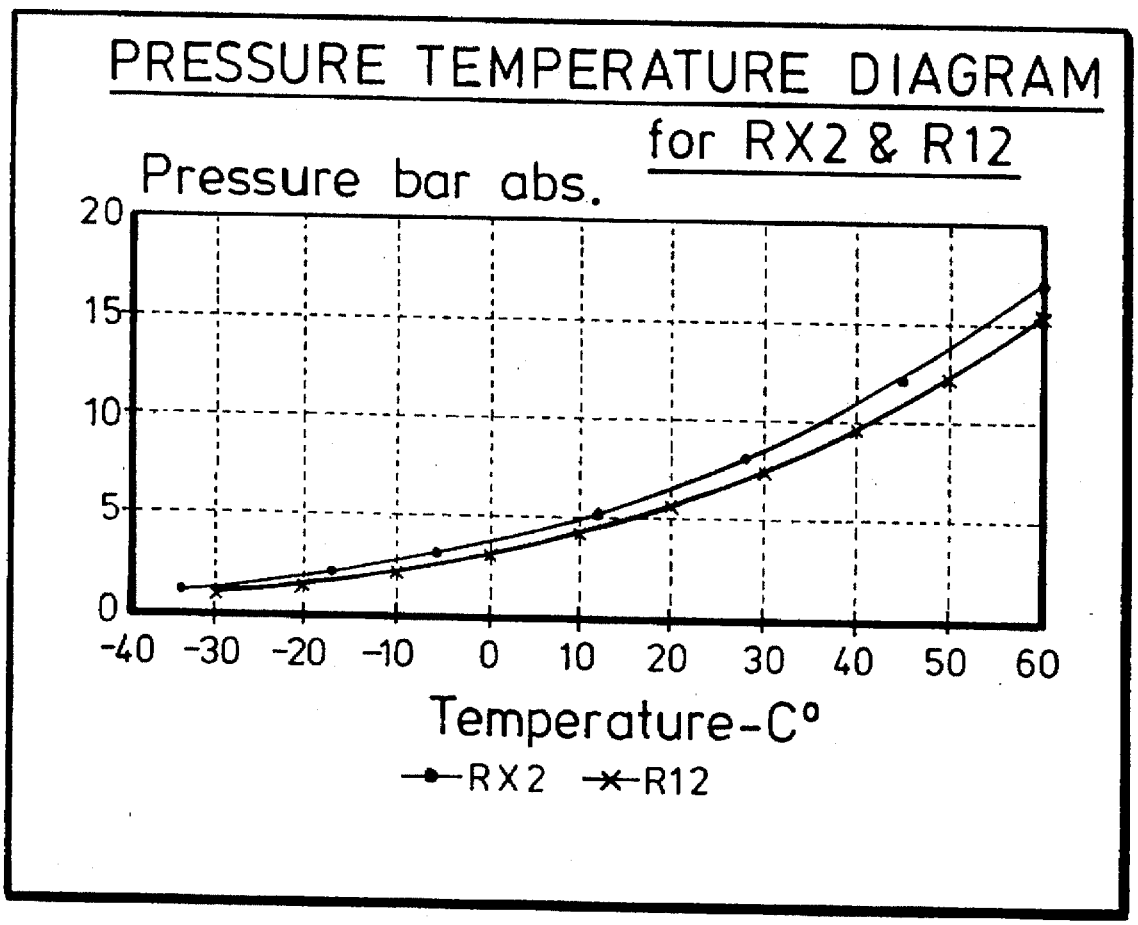
FIG. 2 shows the pressure-temperature diagrams for a further composition according to the invention (RX2) and conventional R12 refrigerant.

FIG. 2 shows the pressure-temperature relationship for a further composition (RX2) according to the invention in comparison to conventional R12 refrigerant. This was obtained following the procedure described in relation to FIG. 1.

The composition (RX2) according to the invention comprised 1 wt % R125, 9 wt % R218, 87 wt % R134a and 3 wt % R600a.

It will be noted that the pressure-temperature relationship for RX2 is very similar to R12, so that it is suitable as a chlorine-free replacement therefor without requiring substantial changes to the refrigeration apparatus.

EXAMPLE

A water chilling system in everyday use and employing refrigerant R12 developed a leak at the hermetically sealed motor terminals. The leak was repaired and the compressor replaced. The system was evacuated and recharged with refrigerant composition RX2 according to the invention of composition given above. Table 1 shows performance characteristics before and after charging with RX2.

The performance using RX2 according to the invention is similar or slightly better than the performance using conventional refrigerant R12.

In Table 1 the abbreviations have the following meanings.

SUCT PRESS and DISCH PRESS are the compressor suction and discharge pressures, respectively.

SUCT TEMP COMP and DISCH TEMP EVAP COIL are compressor suction and discharge temperatures, respectively.

SUCT TEMP EVAP COIL is the suction temperature at the evaporator coil.

LIQ TEMP BEFORE and AFTER HEAT EXCH are the respective temperatures before and after the heat exchanger.

TABLE 1

| (WATER CHILLER - REFRIGERANT RX2 as replacement for R12) | | | | | | | | |
|---|---|---|---|---|---|---|---|---|
| R12 | SUCT PRESS psig | DISCH PRESS psig | SUCT TEMP COMP °C. | DISCH TEMP COMP °C. | SUCT TEMP EVAP COIL °C. | LIQ TEMP BEFORE HEAT EXCH. °C. | LIQ TEMP AFTER HEAT EXCH. °C. | WATER TANK TEMP °C. |
| 1 | 30 | 140 | 16 | 57.7 | 12.7 | 30.5 | 11.5 | 13.2 |
| 2 | 28 | 130 | 15.8 | 62.4 | 8.5 | 28.5 | 11.0 | 9 |
| 3 | 22 | 130 | 13 | 65 | 4.9 | 28 | 12.4 | 4.5 |
| RX2 NEW COMPRESSER AND REFRIGERANT CHARGE | | | | | | | | |
| 1 | 20 | 140 | 14 | 69 | 4 | 38 | 33 | 3.5 |
| 2 | 20 | 150 | 14 | 74 | 6 | 38 | 36 | 3 |
| 3 | 20 | 145 | 13 | 70 | 4.5 | 37 | 36 | 2.5 |
| 4 | 20 | 143 | 13 | 69 | 4.6 | 37 | 35.5 | 2.7 |
| 5 | 30 | 155 | 16 | 70 | 10.1 | 35 | 28 | 8 |
| 6 | 20 | 143 | 13 | 69 | 4 | 36 | 30 | 3 |

I claim:

1. A refrigerant composition for use in a refrigeration apparatus which comprises a mixture of:

(i) 1–50 wt % pentafluoroethane;
(ii) 30–90 wt % tetrafluoroethane; and
(iii) isobutane in an amount greater than zero and less than an amount which would make the mixture flammable.

2. A composition according to claim 1 wherein the isobutane is present in an amount of 1 to 11 wt %, and the composition is non-flammable.

3. A composition according to claim 2 wherein the isobutane is present in an amount of 2 to 10 wt %.

4. A composition according to claim 1 which comprises up to 20 wt % of octafluoropropane.

5. A composition according to claim 4 wherein the octafluoropropane is present in an amount of 5 to 10 wt %.

6. A refrigerant composition for use as a replacement for refrigerant R22 in a refrigeration apparatus which comprises a mixture of:

(i) 20 to 45 wt % pentafluoroethane;
(ii) 45 to 70 wt % tetrafluoroethane;

(iii) 2 to 8 wt % isobutane; and (iv) 5 to 10 wt % octafluoropropane.

7. A refrigerant composition for use as a replacement for refrigerant R12 in a refrigeration apparatus which comprises a mixture of:

(i) 0.5 to 5 wt % pentafluoroethane;

(ii) 75 to 98 wt % tetrafluoroethane;

(iii) 1 to 6 wt % isobutane; and (iv) 6 to 15 wt % octofluoropropane.

* * * * *